US012641177B2

(12) United States Patent
Yau et al.

(10) Patent No.: US 12,641,177 B2
(45) Date of Patent: May 26, 2026

(54) END-TO-END EMERGENCY CALL TESTING

(71) Applicant: T-Mobile USA, Inc., Bellevue, WA (US)

(72) Inventors: Hang Hoi Yau, Sammamish, WA (US); William Hooker, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 414 days.

(21) Appl. No.: 18/165,323

(22) Filed: Feb. 6, 2023

(65) Prior Publication Data

US 2024/0267455 A1     Aug. 8, 2024

(51) Int. Cl.
| | |
|---|---|
| *H04M 3/26* | (2006.01) |
| *H04M 3/24* | (2006.01) |
| *H04W 4/90* | (2018.01) |

(52) U.S. Cl.
CPC .............. *H04M 3/26* (2013.01); *H04M 3/24* (2013.01); *H04W 4/90* (2018.02)

(58) Field of Classification Search
CPC .................................. H04M 3/26; H04M 3/24
USPC ....................................................... 455/404.1
See application file for complete search history.

(56) References Cited

U.S. PATENT DOCUMENTS

| | | | | |
|---|---|---|---|---|
| 9,060,151 | B2 * | 6/2015 | Kim ...................... | H04N 7/0885 |
| 10,791,221 | B1 * | 9/2020 | Vislocky .............. | H04M 3/5116 |
| 2016/0029197 | A1 * | 1/2016 | Gellens .............. | H04L 65/1104 |
| | | | | 455/404.1 |
| 2021/0021979 | A1 * | 1/2021 | Chiang ................ | H04M 3/5116 |
| 2023/0221203 | A1 * | 7/2023 | Dormody .............. | G01C 25/00 |
| | | | | 702/98 |
| 2024/0015535 | A1 * | 1/2024 | Beylin .............. | H04M 3/42221 |

* cited by examiner

*Primary Examiner* — Maria El-Zoobi
(74) *Attorney, Agent, or Firm* — Foley IP Law, PLLC

(57) ABSTRACT

Solutions for testing emergency call handling capability include: receiving, into a user equipment (UE), a dialed number (e.g., "922"); mapping, by the UE, the dialed number to a test service uniform resource name (URN); and transmitting the test service URN to a wireless network. Further solutions include: receiving, by the wireless network, from the UE, the test service URN; differentiating, by the wireless network, the test service URN from an SOS URN; and based on at least receiving the test service URN, establishing an emergency test voice call between the UE and a public safety answering point (PSAP) emulator. In some examples, the test service URN comprises "urn:service" and "test" (e.g., "urn:service:test.sos" or "urn:service: sos.test"), and is flagged by a bit field of an emergency service category value. In some examples, the wireless network transmits to the UE, an indication that the dialed number maps to the test service URN.

20 Claims, 7 Drawing Sheets

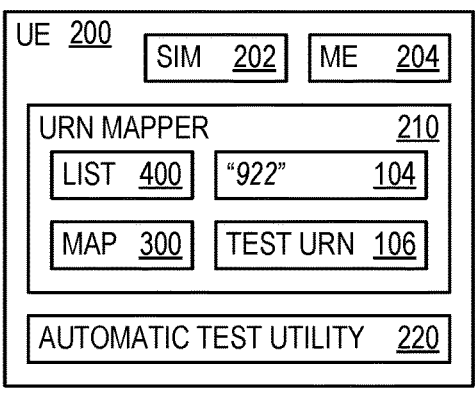

UE  200
SIM  202   ME  204

URN MAPPER  210
LIST  400   "922"  104
MAP  300   TEST URN  106

AUTOMATIC TEST UTILITY  220

FIG. 3A

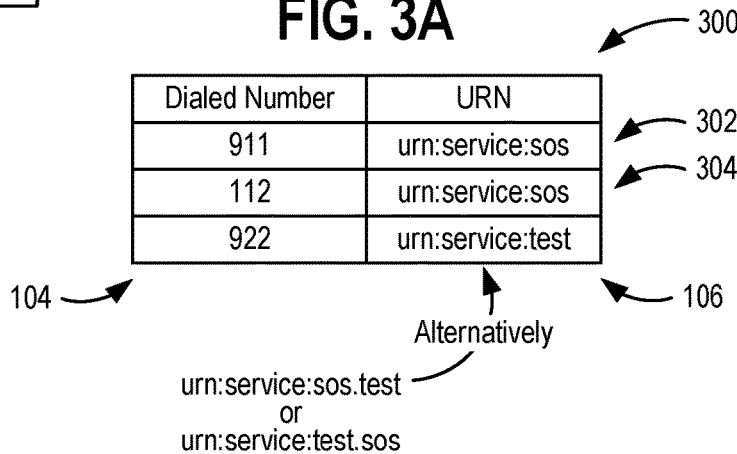

| Dialed Number | URN |
|---|---|
| 911 | urn:service:sos |
| 112 | urn:service:sos |
| 922 | urn:service:test |

300

302

304

104

106

Alternatively urn:service:sos.test
or
urn:service:test.sos

FIG. 3B

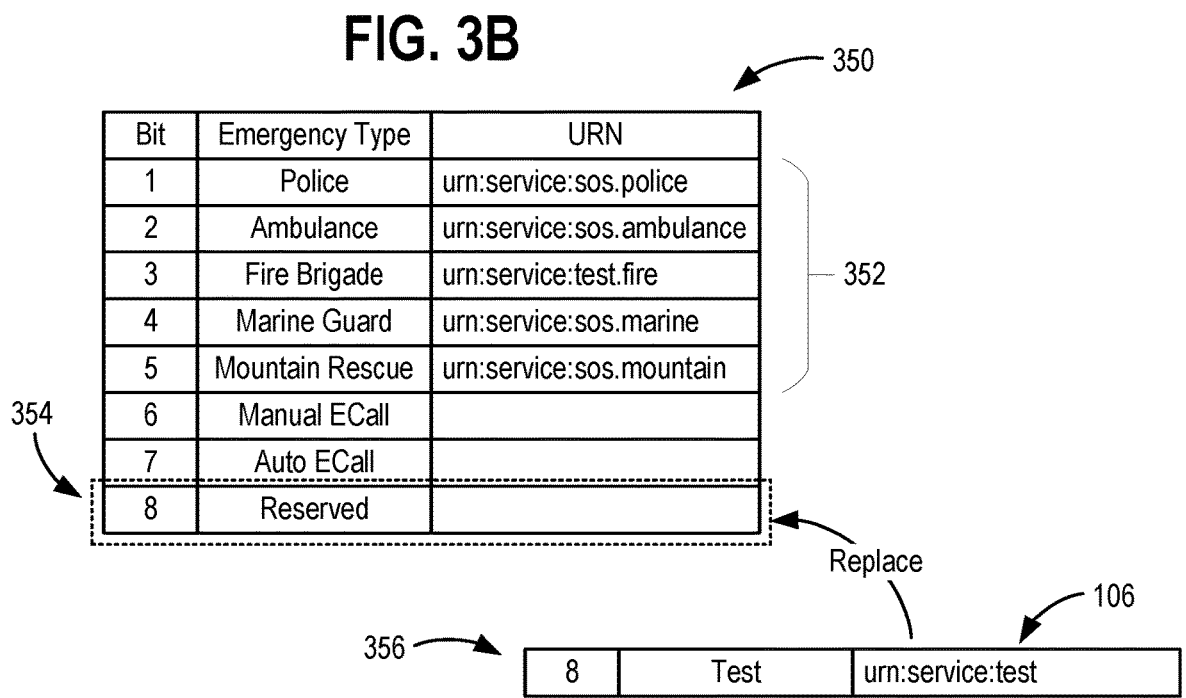

350

| Bit | Emergency Type | URN |
|---|---|---|
| 1 | Police | urn:service:sos.police |
| 2 | Ambulance | urn:service:sos.ambulance |
| 3 | Fire Brigade | urn:service:test.fire |
| 4 | Marine Guard | urn:service:sos.marine |
| 5 | Mountain Rescue | urn:service:sos.mountain |
| 6 | Manual ECall | |
| 7 | Auto ECall | |
| 8 | Reserved | |

352

354

Replace

106

| 8 | Test | urn:service:test |
|---|---|---|

```
emergency_num_list                                    400
 count = 3
 data[0]
  length = 3
  emer_serv_cat_val = 31
  number[0] = 9
  number[1] = 1
  number[2] = 1
  number[3] = 15
 data[1]
  length = 3
  emer_serv_cat_val = 31
  number[0] = 1
  number[1] = 1
  number[2] = 2
  number[3] = 15
 data[2]                          402
  length = 3
  emer_serv_cat_val = 128
  number[0] = 9
  number[1] = 2                        104
  number[2] = 2
  number[3] = 15
```

FIG. 6

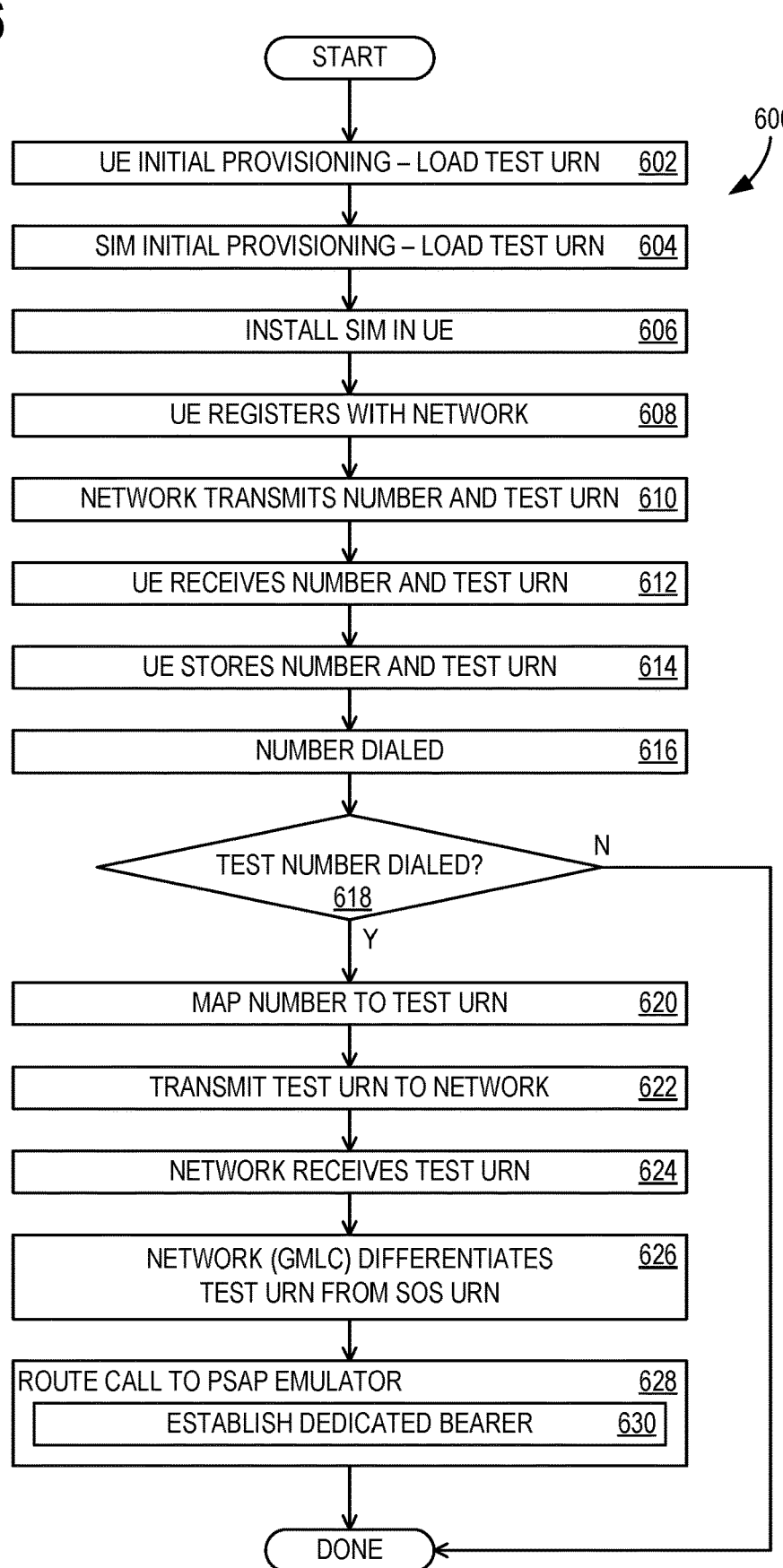

START

600

| UE INITIAL PROVISIONING – LOAD TEST URN | 602 |

| SIM INITIAL PROVISIONING – LOAD TEST URN | 604 |

| INSTALL SIM IN UE | 606 |

| UE REGISTERS WITH NETWORK | 608 |

| NETWORK TRANSMITS NUMBER AND TEST URN | 610 |

| UE RECEIVES NUMBER AND TEST URN | 612 |

| UE STORES NUMBER AND TEST URN | 614 |

| NUMBER DIALED | 616 |

TEST NUMBER DIALED?
618

N

Y

| MAP NUMBER TO TEST URN | 620 |

| TRANSMIT TEST URN TO NETWORK | 622 |

| NETWORK RECEIVES TEST URN | 624 |

| NETWORK (GMLC) DIFFERENTIATES TEST URN FROM SOS URN | 626 |

| ROUTE CALL TO PSAP EMULATOR | 628 |
| ESTABLISH DEDICATED BEARER | 630 |

DONE

FIG. 7

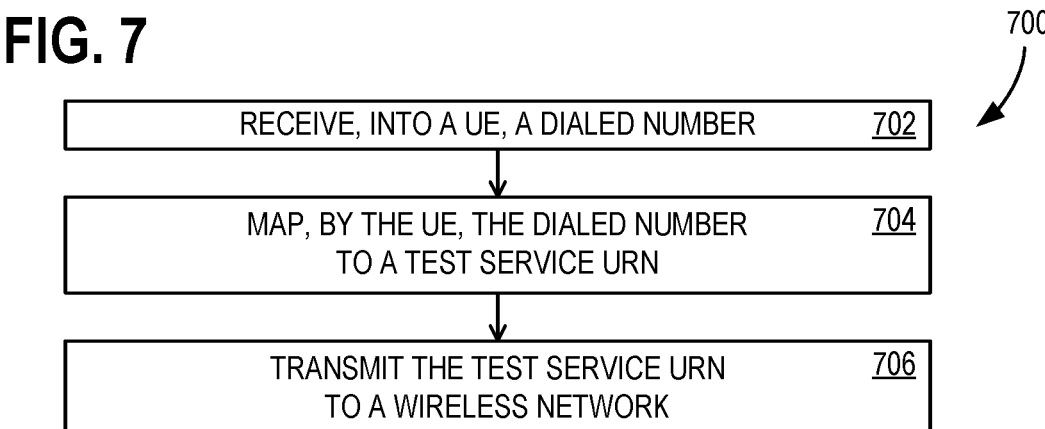

700

| RECEIVE, INTO A UE, A DIALED NUMBER | 702 |

| MAP, BY THE UE, THE DIALED NUMBER TO A TEST SERVICE URN | 704 |

| TRANSMIT THE TEST SERVICE URN TO A WIRELESS NETWORK | 706 |

FIG. 8

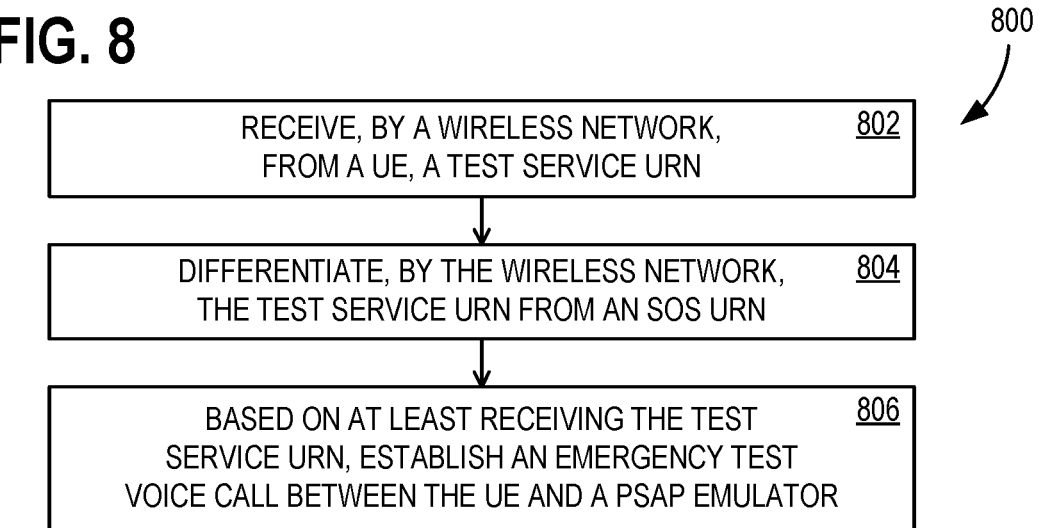

800

| RECEIVE, BY A WIRELESS NETWORK, FROM A UE, A TEST SERVICE URN | 802 |

| DIFFERENTIATE, BY THE WIRELESS NETWORK, THE TEST SERVICE URN FROM AN SOS URN | 804 |

| BASED ON AT LEAST RECEIVING THE TEST SERVICE URN, ESTABLISH AN EMERGENCY TEST VOICE CALL BETWEEN THE UE AND A PSAP EMULATOR | 806 |

END-TO-END EMERGENCY CALL TESTING

BACKGROUND

Cellular networks are based on standards that include those produced by Third Generation Partnership Project (3GPP). 3GPP technical standard (TS) 23.401 is one of the TSs for cellular networks, and defines the support for Emergency Sessions. Additionally, 3GPP TS 24.008 requires that a user equipment (UE) translate (map) dialed emergency numbers, such as "911" in North America (or "112" in the in the European Union) into a uniform resource name (URN), and transmit the URN to the cellular network.

SUMMARY

The following summary is provided to illustrate examples disclosed herein, but is not meant to limit all examples to any particular configuration or sequence of operations.

Solutions for testing emergency call handling include: receiving, into a user equipment (UE), a dialed non-emergency number (e.g., "922"); mapping, by the UE, the dialed number to a test service uniform resource name (URN); and transmitting the test service URN to a cellular network. Further solutions include: receiving, by the wireless network, from the UE, the test service URN; differentiating, by the wireless network, the test service URN from an SOS URN; and based on at least receiving the test service URN, establishing an emergency test voice call between the UE and a public safety answering point (PSAP) emulator. In some examples, the test service URN comprises "urn:service" and "test" (e.g., "urn:service:test.sos" or "urn:service: sos.test"), and is flagged by a bit field of an emergency service category value. In some examples, the wireless network transmits to the UE, an indication that the dialed number maps to the test service URN.

BRIEF DESCRIPTION OF THE DRAWINGS

The disclosed examples are described below with reference to the accompanying drawing figures listed below, wherein:

FIG. 1 illustrates an exemplary architecture that advantageously provides for end-to-end emergency call testing;

FIG. 2 illustrates further detail for the user equipment (UE) of FIG. 1;

FIG. 3A illustrates a mapping table that may be used by the UE of FIG. 2;

FIG. 3B illustrates a notional mapping table change that may be implemented when using the architecture of FIG. 1;

FIG. 4 illustrates an example local emergency number list that may be stored by the UE of FIG. 2;

FIG. 6 illustrates a flowchart of exemplary operations associated with examples of the architecture of FIG. 1;

FIG. 7 illustrates another flowchart of exemplary operations associated with examples of the architecture of FIG. 1;

FIG. 8 illustrates another flowchart of exemplary operations associated with examples of the architecture of FIG. 1.

Figure 5:
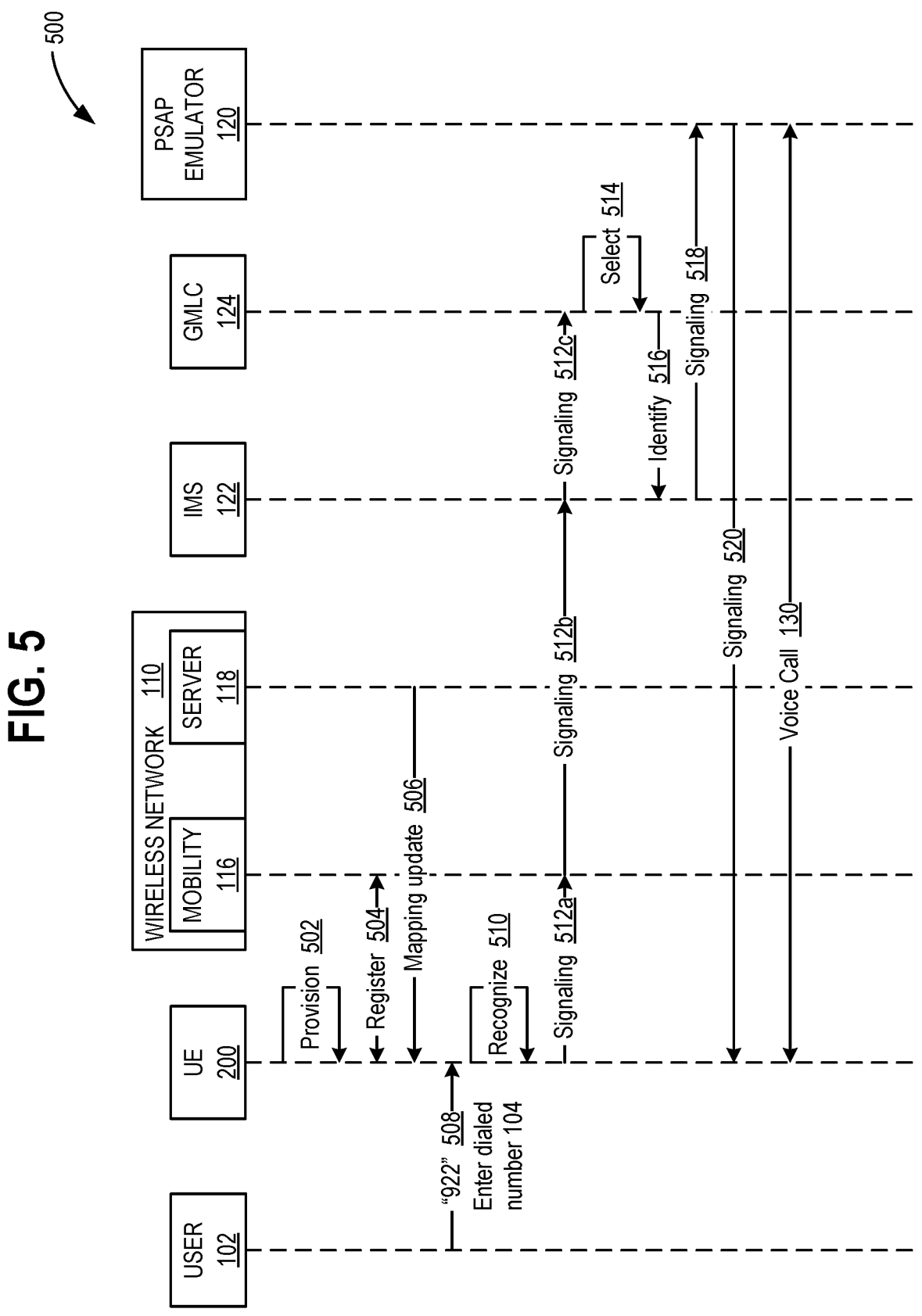
FIG. 5 illustrates a message sequence diagram associated with examples of the architecture of FIG. 1.

Corresponding reference characters indicate corresponding parts throughout the drawings, where practical. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

3GPP TS 24.008 requires that a user equipment (UE) translate (map) dialed emergency numbers, such as "911" in North America (or "112" in the in the European Union) into a uniform resource name (URN), and transmit the URN to the cellular network. Unfortunately, these requirements provide little to no flexibility for end-to-end testing of emergency call handling to ensure the devices are able to perform emergency calling properly, without risking an impact to operations at a PSAP.

Solutions disclosed herein for testing emergency call handling capability include: receiving, into a user equipment (UE), a dialed number (e.g., "922"); mapping, by the UE, the dialed number to a test service uniform resource name (URN); and transmitting the test service URN to a wireless network. Further solutions include: receiving, by the wireless network, from the UE, the test service URN; differentiating, by the wireless network, the test service URN from an SOS URN; and based on at least receiving the test service URN, establishing an emergency test voice call between the UE and a public safety answering point (PSAP) emulator. In some examples, the test service URN comprises "urn:service" and "test" (e.g., "urn:service:test.sos" or "urn:service: sos.test"), and is flagged by a bit field of an emergency service category value. In some examples, the test service URN indicates a specific SOS subservice, such as eCall. In some examples, the wireless network transmits to the UE, an indication that the dialed number maps to the test service URN.

Aspects of the disclosure improve public safety by permitting end-to-end emergency call testing while reducing the risk of creating a false alarm at a PSAP. This is accomplished, at least in part, by a UE mapping a dialed number to a test service URN and a wireless network differentiating the test service URN from an SOS URN (e.g., an URN for a real emergency call that is to be routed to a PSAP).

Figure 1:
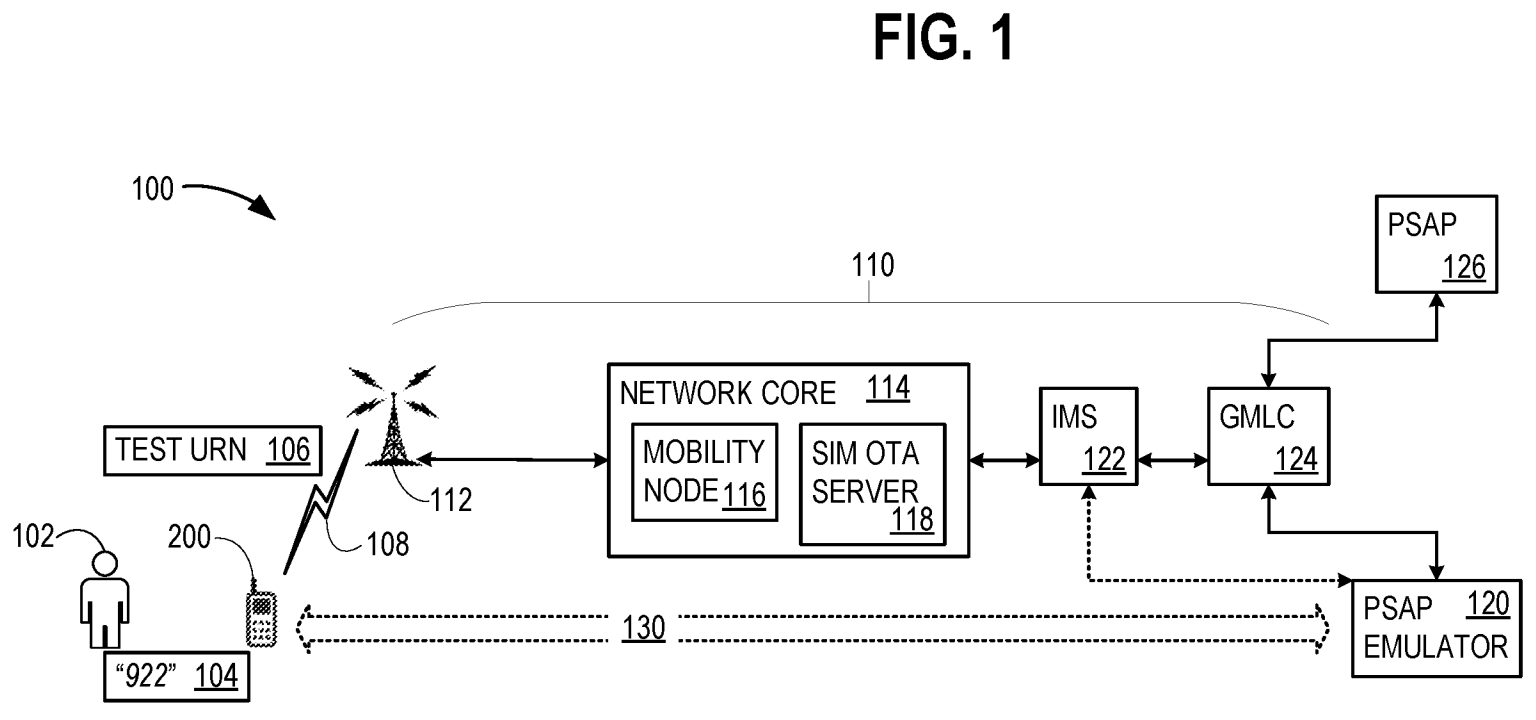

With reference now to the figures, FIG. 1 illustrates an architecture 100 that advantageously provides for end-to-end emergency call testing. In architecture 100, a UE 200 is being served by a wireless network 110 (e.g., a cellular network). A user 102 is able to test the emergency call handling capabilities of wireless network 110 by placing an emergency test voice call 130 between UE 200 and a PSAP emulator 120. PSAP emulator 120 is not a real PSAP, such as a PSAP 126, but is instead configured in a manner that the connection or failure of emergency test voice call 130 is able to reliably predict whether a true emergency call, placed by UE 200, would successfully reach PSAP 126.

User 102 dials a reserved dialed number 104, such as "922" on UE 200, and UE 200 recognizes dialed number 104 as a phone number reserved for testing emergency calls. UE maps dialed number 104 to a test service URN 106, using a URN mapper 210 (shown in FIG. 2), and transmits test service URN 106 over an air interface 108 to a radio access network (RAN) 112 of wireless network 110. In some examples, test service URN 106 comprises the textual characters "urn:service" and "test", such as "urn:service: sos.test", "urn:service:test.sos", or "urn:service:test".

Wireless network 110 has a network core 114 that includes a mobility node 116 and a subscriber identity module (SIM) over-the-air (OTA) server 118. Mobility node 116 may comprise a mobility management entity (MME) or an access mobility function (AMF), or a similar cellular network node. Mobility node 116 receives singling, such as mobility management (MM) connection signaling from RAN 112, and routes it to the proper location. SIM OTA server 118 is used by wireless network 110 to update a SIM 202 (also shown in FIG. 2) within UE 200, if necessary, to ensure that UE 200 is able to operate properly on wireless network 110.

For example, the standard emergency number in North America is "911", while in the European Union (EU) it is "112". A UE roaming between North America and the EU may not have been provisioned properly for the roaming destination. That is, a UE from the EU may not have the functionality to map "911" to an SOS URN such as "urn:service:sos". It is the role of SIM OTA server 118 to provision UE 200 upon UE 200 entering (e.g., registering with) wireless network 110.

An example test is that UE 200 is initially provisioned (by the manufacturer or vendor) to map only "112" to "urn:service:sos", which is the standard SOS URN specified by Third Generation Partnership Project (3GPP) technical standard (TS) 24.008. Architecture 100 then is able to test whether SIM OTA server 118 is able to properly provision UE 200 for operation with anew emergency number, upon registration with wireless network 110.

This test is accomplished by user 102 powering on UE 200 in the vicinity of RAN 112. SIM OTA server 118 provisions UE 200 to map "911" to the SOS URN and also to map "922" (dialed number 104) to test service URN 106. User 102 waits a short time, until the provisioning is expected to be complete, dials "922", and determines whether emergency test voice call 130 successfully reaches PSAP 126. If so, user 102 may infer that dialing "911" would result in successfully reaching PSAP 126, but without disturbing anyone at PSAP 126 and risking perturbing PSAP operations. Otherwise, if emergency test voice call 130 fails, then diagnostic procedures may be employed to determine the cause of the failure.

During the test, mobility node 116 routes test service URN 106 to internet protocol (IP) multimedia system (IMS) 122, which routes it to a gateway mobile location center (GMLC) 124. A GMLC is a network entity that supports location services and, for emergency calls, selects a particular PSAP based on proximity to a calling UE. In some examples, both IMS 122 and GMLC 124 are considered to be within network core 114.

In the test case, GMLC 124 recognizes test service URN 106 and differentiates it from an SOS URN, and so instructs IMS 122 to route emergency test voice call 130 to PSAP emulator 120, rather than PSAP 126. Otherwise, apart from this test scenario, routing of emergency calls is handled according to 3GPP TS 23.167. In some examples, IMS 122 routes emergency test voice call 130 directly to PSAP emulator 120 or a public safety network that supports PSAP emulator 120.

FIG. 2 illustrates further detail for UE 200. UE 200 has a SIM 202 that holds an international mobile subscriber identity (IMSI) that identifies UE 200 to wireless network 110, and also holds further provisioning information, such as mapping information to map dialed numbers to URNs. SIM 202 may be initially provisioned, prior to distribution to user 102 for insertion into UE 200, and also provisioned by SIM OTA server 118 when UE 200 is connected to wireless network 110, UE 200 also has storage capacity outside SIM 202, within a mobile equipment domain (ME) 204, for the mapping information.

UE 200 uses URN mapper 210 to map dialed number 104 to test service URN 106, based on locating dialed number 104 within an emergency number list 400 (shown in FIG. 4) and then finding the correlated URN in a mapping table 300 (shown in FIG. 3A). An automatic test utility 220 is used for automatic testing. This permits emergency test voice call 130 t be initiated either by a user entering dialed number 104 manually, or automatic test utility 220 generating dialed number 104 for an automatic test. An automatic test may be used to periodically test the availability of emergency services in different geographic areas.

FIG. 3A illustrates a mapping table 300 that holds the mapping information and is used by some examples of UE 200 to correlate dialed number 104 with test service URN 106 (i.e., map dialed number 104 to test service URN 106). Mapping table 300 maps "911" to an SOS URN 302, "112" to an SOS URN 304, and "922" to test service URN 106. SOS URN 302 and SOS URN 304 are both shown as "urn:service:sos". Mapping table 300 shows that dialed number 104 correlates with test service URN 106, shown as "urn:service:test", along with alternatives ("urn:service:sos.test"and" urn:service:test.sos").

Mapping table 300 may be stored within ME 204, when UE 200 is provisioned by the manufacturer or vendor of UE 200, or within SIM 202 when SIM 202 is provisioned prior to acquisition by user 102 for UE 200. Mapping table 300 may be stored within SIM 202 when all or part of mapping table 300 is provided by SIM OTA server 118. In some examples, mapping table 300 may span ME 204 and SIM 202.

FIG. 3B illustrates a representative mapping table change for 3GPP TS 24.008. A mapping table 350 is shown in which various bit fields correspond to different emergency types and different specific URNs. The bit fields are bits of an emergency service category value 402 (shown in FIG. 4) when manifest as a binary number. The type of emergency service for an emergency number is derived from the settings of emergency service category value 402. Bit fields 1 through 5 of the emergency service category value 402 are specified in sub-clause 10.5.4.33 of 3GPP TS 24.008, and are shown in Table B.2.2.6.1. The specific SOS URNS shown may be used, in some scenarios, in place of the generic SOS URN of "urn:service:sos".

The human-dialed emergency numbers from a UE are shown in the top five table rows, with SOS URNs 352. Bit field 1 corresponds to "Police", with a URN of "urn:service:sos.police"; bit field 2 corresponds to "Ambulance", with a URN of "urn:service:sos.ambulance"; bit field 3 corresponds to "Fire Brigade", with a URN of "urn:service:sos.fire"; bit field 4 corresponds to "Marine Guard", with a URN of "urn:service:sos.marine"; and bit field 5 corresponds to "Mountain Rescue", with a URN of "urn:service:sos.mountain". Bit fields 6 and 7 correspond to manual and automatic eCalls, respectively, which are emergency calls placed by a vehicle (e.g., in the event of a collision).

The final row 354 of mapping table 350 is for a bit field 8, which has historically been a reserved bit field and set to zero (0). In a replacement row 356, bit field 8 corresponds to "Test", with test service URN 106. With this scheme, bit field 8 of emergency service category value 402 becomes a test flag.

FIG. 4 illustrates an example local emergency number list 400 that may be stored by UE 200. Emergency number list 400 has three numbers stored. For data[0] (the first position in the list, with zero-based indexing), the number is "911", and for data[1] (the second position in the list), the number is "112". The emergency service category value for these list positions is 31, because the first five bit fields are set to 1 and bit field 8, along with bit fields 6 and 7, of the binary representation are set to 0.

For data[2] (the third position in the list), the number is "922", corresponding to dialed number 104, and emergency service category value 402 is 128, because bit field 8 of the binary representation is set to 1 and the remainder of the bit fields are set to zero.

FIG. 5 illustrates a message sequence diagram 500 of messages that may be used with examples of architecture 100. UE 200 or SIM 202 is provisioned to recognize dialed number 104 as an emergency call test at 502. UE 200 registers with wireless network 110 at 504, for example with mobility node 116.

SIM OTA server 118 transmits a message 506 to UE 200 to update mapping table 300 and emergency number list 400. Message 506 comprises an indication that dialed number 104 maps to test service URN 106. This is stored in ME 204 and/or SIM 202.

At 508, user 102 dials "922" (or another dialed number 104 that is specified as correlating to test service URN 106). At 510, UE 200 recognizes "922" is an emergency test number by locating it on emergency number list 400. As a result of locating dialed number 104 on emergency number list 400, UE 200 (specifically, URN mapper 210, in some examples) maps dialed number 104 to test service URN 106.

UE 200 transmits test service URN 106 to wireless network 110 in a SIP invite 512*a*. In some examples, SIP invite 512*a* comprises a remote function call (RFC). An RFC value of 6881 indicates an emergency call. Mobility node 116 receives SIP invite 512*a* and forwards it to IMS 122 as SIP invite 512*b*, which (recognizing it as related to an emergency call, such as due to the RFC value), forwards SIP invite 512*b* to GMLC 124 as SIP invite 512*c*.

GMLC 124 identifies test service URN 106 as a test, differentiating test service URN 106 from an SOS URN, and selects PSAP emulator 120 as the proper destination. GMLC 124 identifies PSAP emulator 120 to IMS 122 at 516. IMS 122 routes a SIP invite 518 to PSAP emulator 120, which returns a SIP OK 520 to UE 200. Wireless network 110 then establishes emergency test voice call 130 between UE 200 and PSAP emulator 120.

FIG. 6 illustrates a flowchart 600 of exemplary operations associated with end-to-end emergency call testing by architecture 100. In some examples, at least a portion of flowchart 600 is performed using one or more computing devices 900 of FIG. 9 (e.g., UE 200 and any of the network nodes of architecture 100 may use examples of computing device 900). Flowchart 600 commences with provisioning UE 200 with mapping table 300 correlating dialed number 104 with test service URN 106, in operation 602.

In operation 604, the provider of SIM 202 provisions SIM 202 with mapping table 300, correlating dialed number 104 with test service URN 106, and user 102 inserts (installs) SIM 202 into UE 200 in operation 606. UE 200 registers with wireless network 110 in operation 608. In operation 610, wireless network 110 transmits an indication (message 506) that dialed number 104 maps to test service URN 106 to UE 200. UE 200 receives message 506 in operation 612, and stores the indication that dialed number 104 corresponds to test service URN 106 (e.g., stores updates to mapping table 300 and/or emergency number list 400) in operation 614. That is, in operation 614, UE 200 stores test service URN 106 and/or dialed number 104 within ME 204, or SIM 202, or local emergency number list 400.

At this point, dialed number 104 and test service URN 106 are stored within UE, 200, such as within ME 204, or SIM 202, or local emergency number list 400 as a result of any of operation 602, the combination of operations 604 and 606, and the combination of operations 610-614. These represent initial UE provisioning, SIM provisioning, and OTA provisioning.

In operation 616 UE 200 receives dialed number 104, for example by user 102 entering dialed number 104 into UE 200 as part of an end-to-end emergency call test. In decision operation 618, UE 200 determines whether dialed number 104 corresponds to a URN stored on UE 200, for example, by locating dialed number 104 within local emergency number list 400. If dialed number 104 is not identified as an emergency test number, flowchart 600 terminates.

Otherwise, UE 200 maps dialed number 104 to test service URN 106 in operation 620, for example by identifying that dialed number 104 corresponds with test service URN 106 in mapping table 300. In operation 622, UE 200 transmits test service URN 106 to wireless network 110. In some examples, transmitting test service URN 106 to wireless network 110 comprises transmitting a SIP invite.

Wireless network 110 receives test service URN 106 from UE 200 in operation 624, and differentiates test service URN 106 from an SOS URN in operation 626. In operation 628, wireless network 110 establishes emergency test voice call 130 between UE 200 and PSAP emulator 120. This includes, based on at least receiving test service URN 106, establishing a dedicated bearer for UE 200 for emergency test voice call 130, in operation 630.

FIG. 7 illustrates a flowchart 700 of exemplary operations associated with examples of architecture 100. In some examples, at least a portion of flowchart 700 may be performed using one or more computing devices 900 of FIG. 9. Flowchart 700 commences with operation 702, which includes receiving, into a UE, a dialed number. Operation 704 includes mapping, by the UE, the dialed number to a test service URN. Operation 706 includes transmitting the test service URN to a wireless network.

FIG. 8 illustrates a flowchart 800 of exemplary operations associated with examples of architecture 100. In some examples, at least a portion of flowchart 800 may be performed using one or more computing devices 900 of FIG. 9. Flowchart 800 commences with operation 802, which includes receiving, by a wireless network, from a UE, a test service URN. Operation 804 includes differentiating, by the wireless network, the test service URN from an SOS URN. Operation 806 includes, based on at least receiving the test service URN, establishing an emergency test voice call between the UE and a PSAP emulator.

Figure 9:
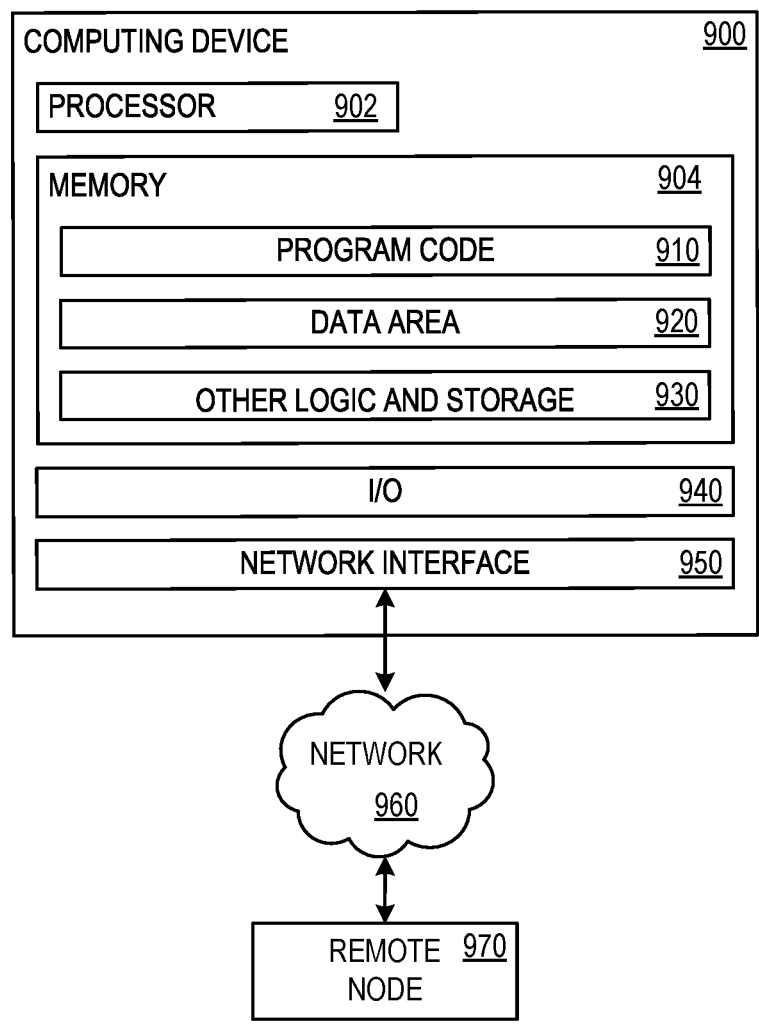
FIG. 9 illustrates a block diagram of a computing device suitable for implementing various aspects of the disclosure.

FIG. 9 illustrates a block diagram of computing device 900 that may be used as any component described herein that may require computational or storage capacity. Computing device 900 has at least a processor 902 and a memory 904 that holds program code 910, data area 920, and other logic and storage 930. Memory 904 is any device allowing information, such as computer executable instructions and/ or other data, to be stored and retrieved. For example, memory 904 may include one or more random access memory (RAM) modules, flash memory modules, hard disks, solid-state disks, persistent memory devices, and/or optical disks. Program code 910 comprises computer executable instructions and computer executable components including any instructions necessary to perform operations described herein. Data area 920 holds any data necessary to perform operations described herein. Memory 904 also includes other logic and storage 930 that performs or facilitates other functions disclosed herein or otherwise required of computing device 900. An input/output (I/O) component 940 facilitates receiving input from users and other devices and generating displays for users and outputs for other devices. A network interface 950 permits communication over a network 960 with a remote node 970, which may represent another implementation of computing device 900. For example, a remote node 970 may represent another of the above-noted nodes within architecture 100.

Additional Examples

A method of testing emergency call handling capability, the method comprising: receiving, into a UE, a dialed number; mapping, by the UE, the dialed number to a test service URN; and transmitting the test service URN to a wireless network.

Another method of testing emergency call handling capability, the method comprising: receiving, by a wireless network, from a UE, a test service URN; differentiating, by the wireless network, the test service URN from an SOS URN; and based on at least receiving the test service URN, establishing an emergency test voice call between the UE and a PSAP emulator.

A system for testing emergency call handling capability, the system comprising: a processor; and a computer-readable medium storing instructions that are operative upon execution by the processor to: receive, into a UE, a dialed number; map, by the UE, the dialed number to a test service URN; and transmit the test service URN to a wireless network.

Another system for testing emergency call handling capability, the system comprising: a processor; and a computer-readable medium storing instructions that are operative upon execution by the processor to: receive, by a wireless network, from a UE, a test service URN; differentiate, by the wireless network, the test service URN from an SOS URN; and based on at least receiving the test service URN, establish an emergency test voice call between the UE and a PSAP emulator.

One or more example computer storage devices has computer-executable instructions stored thereon, which, upon execution by a computer, cause the computer to perform operations comprising: receiving, into a UE, a dialed number; mapping, by the UE, the dialed number to a test service URN; and transmitting the test service URN to a wireless network.

One or more additional example computer storage devices has computer-executable instructions stored thereon, which, upon execution by a computer, cause the computer to perform operations comprising: receiving, by a wireless network, from a UE, a test service URN; differentiating, by the wireless network, the test service URN from an SOS URN; and based on at least receiving the test service URN, establishing an emergency test voice call between the UE and a PSAP emulator.

Alternatively, or in addition to the other examples described herein, examples include any combination of the following:

the emergency call comprises an E911 voice call or an E112 voice call;

the test service URN comprises urn:service and test;

receiving, by the UE, from the wireless network, an indication that the dialed number maps to the test service URN;

the test service URN is stored within an ME, or a SIM, or a local emergency number list;

the dialed number is stored within an ME, or a SIM, or a local emergency number list;

establishing an emergency test voice call between the UE and a PSAP emulator;

the dialed number comprises 922;

the test service URN is flagged by bit field 8 of an emergency service category value;

provisioning the UE with a mapping table correlating the dialed number with the test service URN the test service URN comprises urn:service:test, or urn:service:test.sos, or urn:service:sos.test;

the test service URN is flagged by a bit of an emergency service category value;

provisioning the SIM with a mapping table correlating the dialed number with the test service URN;

registering, by the UE, with the wireless network;

the wireless network comprises a cellular network;

the wireless network comprises a network core;

transmitting, by the wireless network, to the UE, an indication that the dialed number maps to the test service URN;

storing, by the UE, an indication that the dialed number corresponds to the test service URN;

storing, by the UE, the test service URN and/or the dialed number within an ME, or a SIM, or a local emergency number list;

determining, by the UE, whether the dialed number corresponds to a URN stored on the UE;

transmitting the test service URN to the wireless network comprises transmitting a SIP message;

receiving, by the wireless network, from the UE, the test service URN;

differentiating, by the wireless network, the test service URN from an SOS URN;

based on at least receiving the test service URN, establishing, by the wireless network, for the UE, a dedicated bearer for an emergency test voice call; and establishing, by the wireless network, an emergency test voice call between the UE and a PSAP emulator.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of testing emergency call handling capability, the method comprising:

provisioning a subscriber identity module (SIM) of a user equipment (UE) with a mapping table correlating a dialed number with a test service uniform resource name (URN);

receiving, into the UE, the dialed number;

mapping, by the UE, the dialed number to the test service URN by finding the test service URN that corresponds to the dialed number in the mapping table; and transmitting the test service URN to a wireless network.

2. The method of claim 1, wherein the test service URN further comprises a text string urn: service, and wherein the wireless network differentiates the test service URN from an SOS URN based on the text string test.

3. The method of claim 1, further comprising:

receiving, by the UE, from the wireless network, an indication that the dialed number maps to the test service URN.

4. The method of claim 1, wherein the test service URN and/or the dialed number are stored within a mobile equipment domain (ME), or the SIM, or a local emergency number list.

5. The method of claim 1, further comprising:

establishing an emergency test voice call between the UE and a public safety answering point (PSAP) emulator, wherein the test service URN is routed to a gateway mobile location center (GMLC), which differentiates the test service URN from a SOS URN and selects the PSAP emulator.

6. The method of claim 1, wherein the dialed number is associated with an emergency test voice call, and wherein the dialed number comprises 922.

7. The method of claim 1, wherein mapping the dialed number to the test service URN comprises finding the test service URN that corresponds to the dialed number in the mapping table, and wherein the test service URN is flagged by $8^{th}$ bit of an emergency service category value of the mapping table.

8. A system for testing emergency call handling capability, the system comprising:

a processor; and a computer-readable medium storing instructions that are operative upon execution by the processor to:

provision a subscriber identity module (SIM) of a user equipment (UE) with a mapping table correlating a dialed number with a test service uniform resource name (URN);

receive, into the UE, the dialed number;

map, by the UE, the dialed number to the test service URN by finding the test service URN that corresponds to the dialed number in the mapping table; and transmit the test service URN to a wireless network.

9. The system of claim 8, wherein the test service URN further comprises a text string urn: service, and wherein the wireless network differentiates the test service URN from an SOS URN based on the text string test.

10. The system of claim 8, wherein the instructions are further operative to:

receive, by the UE, from the wireless network, an indication that the dialed number maps to the test service URN.

11. The system of claim 8, wherein the test service URN and/or the dialed number are stored within a mobile equipment domain (ME), or the SIM, or a local emergency number list.

12. The system of claim 8, wherein the instructions are further operative to:

establish an emergency test voice call between the UE and a public safety answering point (PSAP) emulator, wherein the test service URN is routed to a gateway mobile location center (GMLC), which differentiates the test service URN from a SOS URN and selects the PSAP emulator.

13. The system of claim 8, wherein the dialed number is associated with an emergency test voice call, and wherein the dialed number comprises 922.

14. The system of claim 8, wherein mapping the dialed number to the test service URN comprises finding the test service URN that corresponds to the dialed number in the mapping table, and wherein the test service URN is flagged by $8^{th}$ bit of an emergency service category value of the mapping table.

15. One or more computer storage devices having computer-executable instructions stored thereon, which, upon execution by a computer, cause the computer to perform operations comprising:

provisioning a subscriber identity module (SIM) of a user equipment (UE) with a mapping table correlating a dialed number with a test service uniform resource name (URN);

receiving, into the UE, the dialed number;

mapping, by the UE, the dialed number to the test service URN by finding the test service URN that corresponds to the dialed number in the mapping table; and transmitting the test service URN to a wireless network.

16. The one or more computer storage devices of claim 15, wherein the test service URN further comprises a text string urn: service, and wherein the wireless network differentiates the test service URN from an SOS URN based on the text string test.

17. The one or more computer storage devices of claim 15, wherein the operations further comprise:

receiving, by the UE, from the wireless network, an indication that the dialed number maps to the test service URN.

18. The one or more computer storage devices of claim 15, wherein the test service URN and/or the dialed number are stored within a mobile equipment domain (ME), or the SIM, or a local emergency number list.

19. The one or more computer storage devices of claim 15, wherein the operations further comprise:

establishing an emergency test voice call between the UE and a public safety answering point (PSAP) emulator, wherein the test service URN is routed to a gateway mobile location center (GMLC), which differentiates the test service URN from a SOS URN and selects the PSAP emulator.

20. The one or more computer storage devices of claim 15, wherein the dialed number is associated with an emergency test voice call, and wherein the dialed number comprises 922.

* * * * *